Patented Jan. 7, 1947

2,414,016

UNITED STATES PATENT OFFICE 2,414,016

SULFOSUCCINATE ESTERS OF p-SECONDARY-BUTYLCYCLOHEXANOL

Joseph J. Carnes, Greenwich, Conn., assignor to American Cyanamid Company, New York, N. Y., a corporation of Maine No Drawing. Application September 1, 1945, Serial No. 614,088

1 Claim. (Cl. 260—481)

This invention relates to surface-active compounds and their methods of preparation, and more particularly to sulfosuccinate esters of para- or 4-secondary-butylcyclohexanol. A principal object of the invention is to provide a new class of chemical compounds having improved rewetting properties. A further object is the provision of compounds of the same class which are good detergents.

I have found that the mono- and diesters of sulfosuccinic acid with 4-secondary-butylcyclohexanol are surface-active compounds possessing the properties described above. The monoesters, when used in the form of their disodium or dipotassium salts, possess good detergent properties. The diesters are particularly good rewetting agents and may also be used as anti-fogging agents to prevent the formation of fog on transparent objects such as glass coated therewith.

The compounds of the present invention have the following structural formula

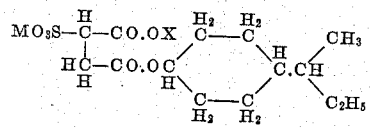

in which M is a salt-forming metal or radical and is preferably sodium, potassium or ammonium and X is either M or a p-secondary-butylcyclohexyl radical.

The novel compounds of my invention are preferably prepared by esterifying maleic acid or anhydride with 4-secondary-butylcyclohexanol to produce the monoester or diester, followed by sulfonating the ester so obtained to form the sulfosuccinate. Preferably the sulfonation is carried out by heating the ester with an aqueous solution of sodium sulfite, sodium bisulfite, or sodium metabisulfite, or of the corresponding potassium or ammonium compounds. By this method the water-soluble salts of the sulfosuccinate esters are obtained directly.

The mono-(4-secondary-butylcyclohexyl) sulfosuccinate is prepared by mixing equimolecular quantities of maleic anhydride and p-secondary-butylcyclohexanol and agitating the mixture at about 100–110° C. until the reaction is complete. The mono-p-secondary-butylcyclohexyl maleate is then poured into a water solution of sodium sulfite and heated on a steam bath for 1–2 hours, or until the sulfonation is complete. Upon evaporating the solution to dryness the product is obtained as a white, waxy solid which dissolves readily in warm water to clear, foaming solutions having good detergent properties.

The di-(p-secondary-butylcyclohexyl) sulfosuccinate is prepared by the same general procedure, but sufficient of the alcohol is used to completely esterify the maleic anhydride or maleic or fumaric acid. The esterification is preferably carried out in the presence of a solvent such as toluene with the aid of an esterification catalyst and the product is sulfonated by refluxing with a solution of sodium metabisulfite in aqueous ethanol.

Example p-Secondary-butylcyclohexanol was prepared by hydrogenating a redistilled p-secondary-butylphenol under 2,600 pounds per square inch pressure at 175° C. using a nickel catalyst. The product was filtered to remove the catalyst and distilled to obtain the alcohol as a colorless liquid having a boiling point of 109–111° C. at 10 mm. of mercury pressure.

A mixture of 300 grams (1.75 mols+10% excess) of the 4-secondary-butylcyclohexanol was mixed with 86 grams (0.875 mol) of maleic anhydride and 6 grams of p-toluenesulfonic acid in 370 cc. of toluene and refluxed with stirring at 116–122° C. for 5 hours. The water was stripped off in a trap and the product was cooled and washed with water and then with 2.5% NaOH solution until the washings were neutral, after which the toluene and excess alcohol were removed by heating to 190° C. at 0.4 mm. pressure. The di-(4-secondary-butylcyclohexyl) maleate was a light yellow, viscous oily liquid having a purity of about 99%.

A mixture of 150 grams of the product with 37.5 grams of sodium metabisulfite ($Na_2S_2O_5$) and 200 cc. of ethanol and 60 cc. of water was refluxed with agitation at 80–81° C. for about 6–7 hours, after which the solution was filtered. The filtrate was evaporated and the residue dried at 100° C. The di-(4-secondary-butylcyclohexyl) sodium sulfosuccinate was obtained as a hard white wax which dissolved slowly to a clear solution in hot water.

The product was evaluated as a rewetting agent by timing the absorption of water drops by cotton impregnated therewith. For purposes of comparison the rewetting times of di-2-ethylhexyl sodium sulfosuccinate are also given in the following table. This product is in wide commercial use as a rewetting agent for sized cotton cloth, being sold under the trade name "Aerosol OT."

| Compound | Per cent conc. v. rewetting time, seconds | | | | | Per cent conc. required for— | |
|---|---|---|---|---|---|---|---|
| | 0.25 | 0.15 | 0.1 | 0.08 | 0.06 | 1 sec. rewetting | 30 sec. rewetting |
| Aerosol OT | 7.0 | 18 | 38 | 57 | 180 | 0.72 | 0.11 |
| Di-(4-secondary-butylcyclohexyl) sodium sulfo-succinate | 1.0 | 7.0 | 15 | 21 | 34 | .25 | .064 |

These results show that the new compound has from 2 to 3 times the rewetting power of Aerosol OT.

What I claim is:

Di-(p-secondarybutylcyclohexyl) sodium sulfosuccinate.

JOSEPH J. CARNES.